Aug. 30, 1955
H. A. LAND
2,716,577
TENSIONING APPARATUS FOR ENDLESS
TRACKS OF CRAWLER VEHICLES
Filed May 3, 1952
2 Sheets-Sheet 1
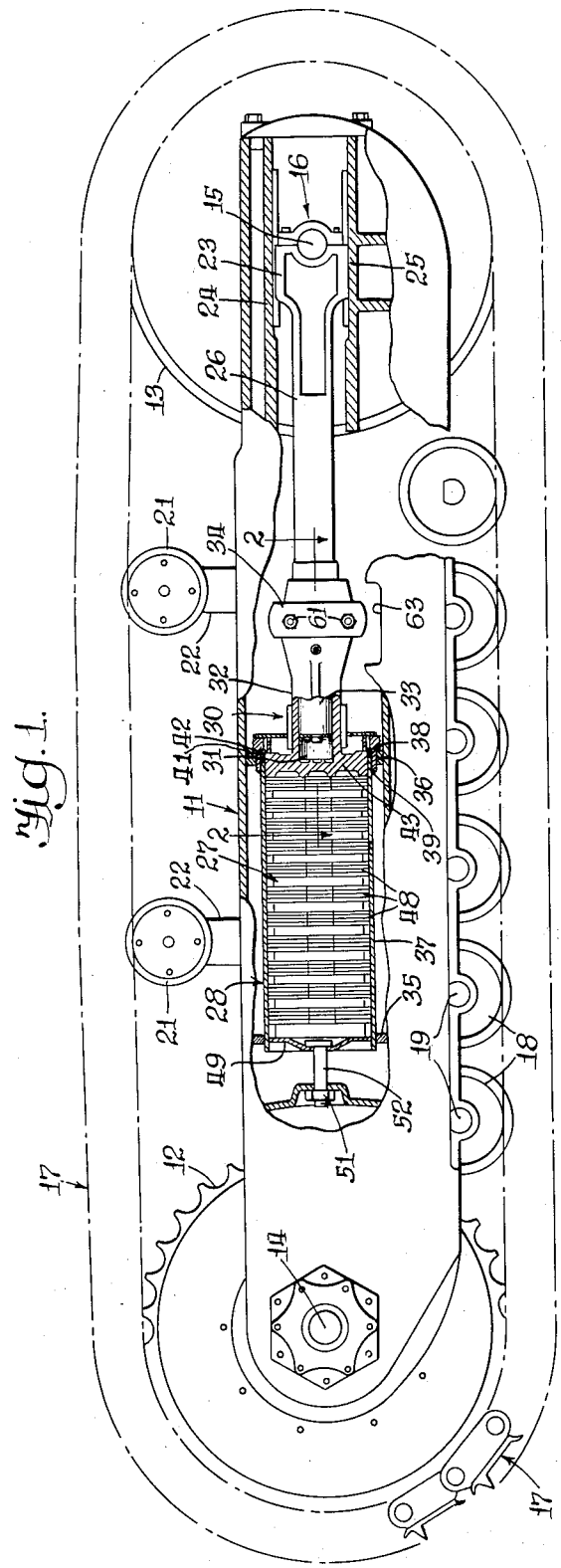
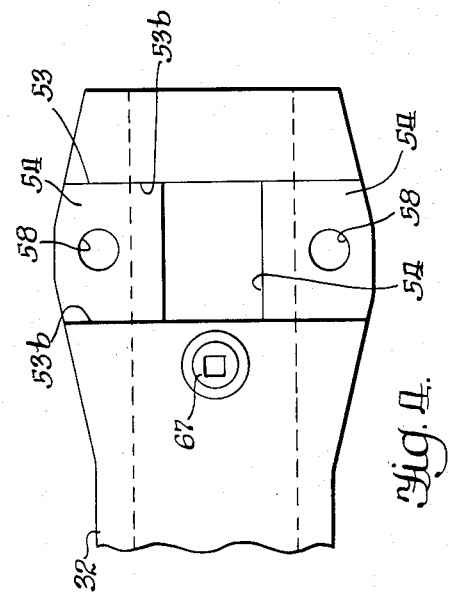
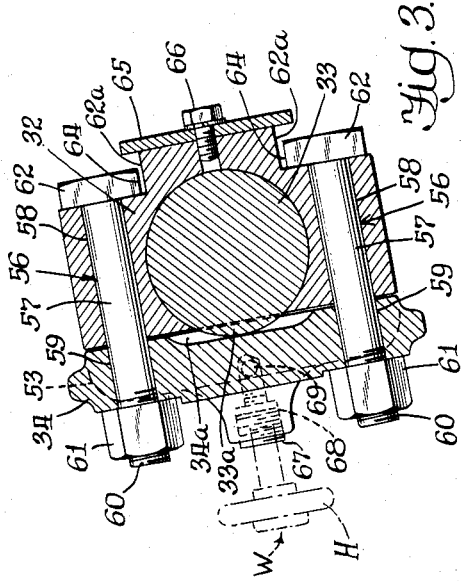
INVENTOR.
Harry A. Land
BY Paul O. Pippel
Atty

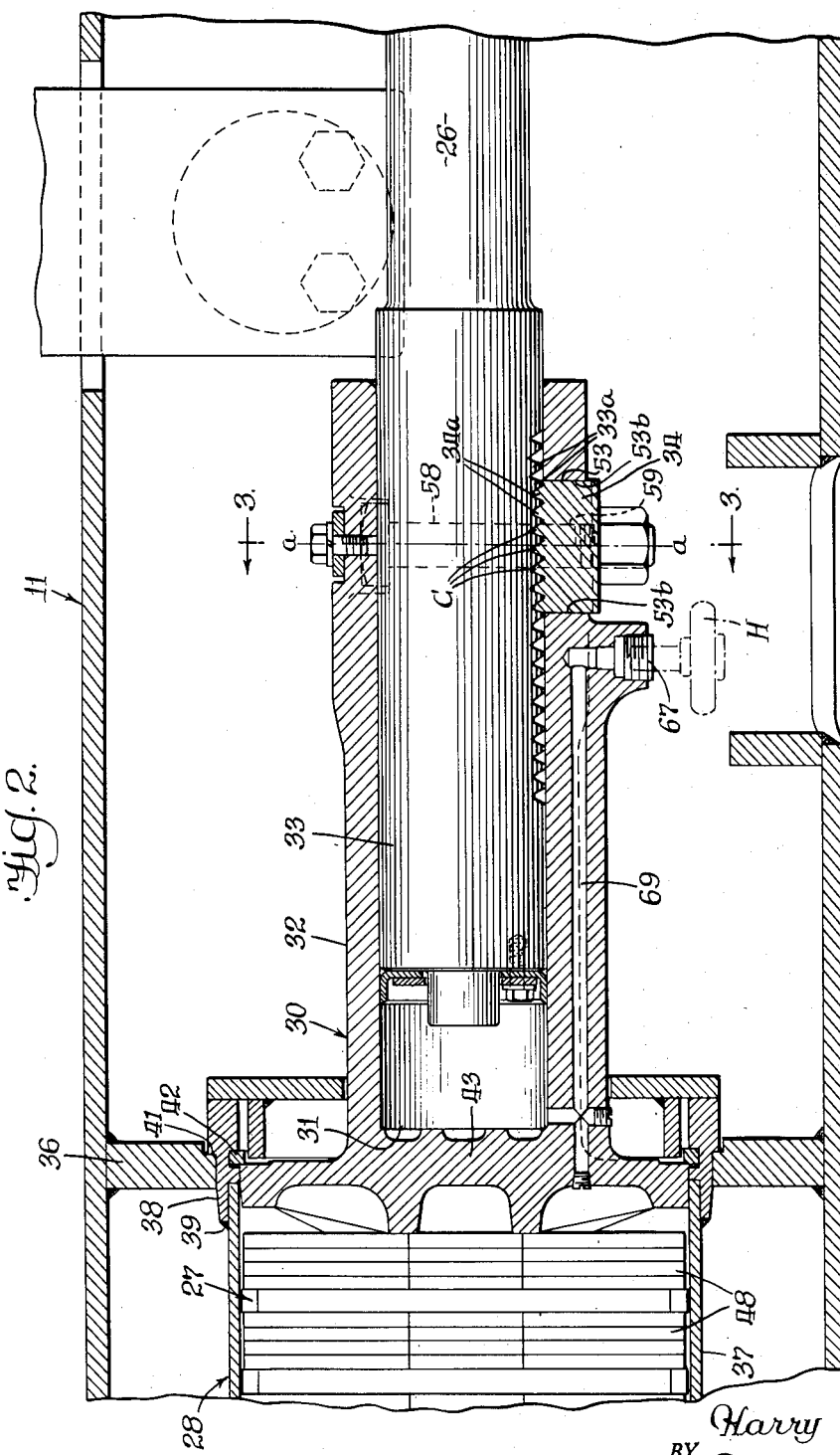

United States Patent Office 2,716,577
Patented Aug. 30, 1955

2,716,577

TENSIONING APPARATUS FOR ENDLESS TRACKS OF CRAWLER VEHICLES

Harry A. Land, Algonquin, Ill., assignor to International Harvester Company, a corporation of New Jersey Application May 3, 1952, Serial No. 285,880

5 Claims. (Cl. 305—9)

This invention concerns crawler type vehicles wherein there are track frames having endless tracks and more particularly concerns improvements in the apparatus for adjusting tension or the amount of slack in the tracks. The invention is a further species of that in my copending patent application Serial No. 218,026, filed March 28, 1951, now Pat. No. 2,683,064, for Tensioning Apparatus for Endless Tracks of Crawler Vehicles.

It is standard practice in the construction of crawler vehicles to employ track tensioning means for the endless tracks which revolve about track frames upon opposite sides of the vehicle body. Such vehicles are of the character that are steered by causing the tracks to revolve at selectively different speeds or to proceed in straight course by causing the tracks to revolve at the same speed. Driving force is imparted to each track by a large driving sprocket which is normally within the rear end of an elongated loop formed by such track. An idler wheel normally provides support for the front end of the track where the front end of the track loop is trained about this idler wheel. Desired tautness or limitation of slack in the track is provided for by mounting the idler wheel upon a bearing head therefor slidable endwise of the track frame together with a captive spring assembly mounted on the track frame rearwardly of the idler wheel and against which the bearing head reacts. This captive spring assembly amounts to an overload release mechanism to permit retraction of the idler wheel and thereby prevent an over-tension in the track or breakage thereof by an expansion force which might be caused by a stone or other non-compressible object becoming accidentally wedged between the track and either the sprocket or the wheel.

Adjustment of the track tension is conventionally obtained by an elongatively adjustable thrust structure interposed between the idler wheel bearing head and the overload release assembly. Elongation adjustment of the thrust structure for obtaining the desired amount of tension or limited slack or looseness in the track is customarily accomplished by rotation of threaded members, although it has been proposed to employ a hydraulic ram as in said copending application to avoid the inconvenience and tediousness of effecting the adjustment. Maintenance of proper track tension is very significant to prevent inordinate wear upon the track and driving sprockets therefor.

The principal object of this invention is the provision in a crawler vehicle track frame of a hydraulic ram for adjusting the tension or limited slack in the track together with complemental disengageably meshed toothed elements respectively upon the ram plunger and mounted on the ram cylinder to positively lock the plunger and cylinder against relative movement subsequent to an hydraulic adjustment thereof.

A further object is the provision of a track frame in the form of a housing for the ram and having a service access opening, and wherein the ram cylinder contains a fluid supply passage with an inlet in registry with said access opening, and wherein the cylinder also carries one of the toothed elements in registry with the access opening through which means is manipulatable for meshing or demeshing said element.

The above and other objects inherent in and encompassed by the invention are elucidated in the ensuing specification, the appended claims and the annexed drawings, wherein:

Fig. 1 is a side elevational view of a crawler tractor track frame together with parts carried thereby including track-tensioning apparatus constituting a preferred embodiment of the present invention, there being parts of the track frame removed and parts of an overload release assembly shown in section to clarify the environment for the invention.

Fig. 2 is an enlarged framentary sectional view taken at the plane indicated by the line 2—2 of Fig. 1.

Fig. 3 is a transverse sectional view taken on the line 3—3 of Fig. 2.

Fig. 4 is a fragmentary side elevational view of the ram cylinder, illustrating a side-wall groove and slot therein.

Apparatus as that shown in the drawings is employed on each side of a crawler type vehicle. The apparatus includes a track frame 11 having a track driving sprocket 12 at its rear end and a track idler wheel 13 at its front end. The driving sprocket 12 is rotated about a fixed axis 14 whereas the idler wheel 13 is rotatable about an axis 15 which is adjustable lengthwise of the track with a bearing structure 16. This bearing structure 16, together with the idler 13 constitute a track idler assembly 13—16. An articulated endless track 17 is trained about the driving sprocket 12 and the idler wheel 13. The track frame 11 and the components mounted thereon are carried upon the lower flight of the track by a plurality of track rollers 18 rotatable upon journal shafts 19 therefor fixed upon the lower side of the frame. A pair of track-supporting rollers 21 mounted on brackets 22 projecting upwardly from the track frame support the upper flight of the track 17.

The bearing structure 16 of the front idler assembly is carried upon a cross-head 23 movable endwise of the track frame upon upper and lower guides 24 and 25. A thrust rod 26 for the cross-head projects rearwardly for thrust reaction against a captive spring unit 27 of an overload release assembly 28. An expansible connection between the overload release assembly 28 and the thrust rod 26 is provided by an hydraulic ram 30 including a fluid-receiving chamber 31, a cylinder 32 containing a portion of said chamber and a plunger 33 formed upon the rear end of the thrust rod 26. The position of the front idler 13 for limiting the amount of slack in the track 17 can be selectively determined by controlling the amount of fluid in the ram chamber 31. When it is desired to move the idler forwardly for diminishing the slack, a toothed locking plate 34 is first demeshed from a linear series of teeth 33a on a side of the plunger 33, whereupon fluid will be forced into the chamber 31 and thereby project the plunger 33 and the front idler forwardly the necessary amount. The fluid, which is normally oil, is relatively noncompressible and will maintain the adjustment until this action of the fluid is supplemented or replaced by remeshing the teeth 34a of the locking plate with the plunger teeth 33a.

The track frame 11 is hollow and contains axially spaced braces 35 and 36 in support of a cylindrical spring chamber 37. The rear end of the spring chamber 37 is supported within the brace 35 and the forward end within the brace 36. A ring 38 surrounding and welded to the cylinder 37 at 39 has a shoulder 41 which overlies and reacts against the front side of the brace 36 to prevent rearward movement of the spring chamber. A snap ring 42 in the ring 38 limits forward movement of a spring reaction plunger 43 in the spring chamber 37.

A plurality of sets of Bellville springs 48 are held captive in a compressed condition between the spring reaction plunger 43 and a rear end wall 49 of the spring chamber. The degree of compression of the Bellville springs is determined by the spacing between the spring reaction elements 43 and 49 and such spacing is selectable by rotating of a nut 51 upon the threaded rear end of adjuster rod 52 which has its front end fixed coaxially to the plunger element 43. This type of captive spring unit is described in detail in U. S. Patent No. 2,506,360.

The ram cylinder 32 constitutes a tubular extension of the spring reaction plunger 43. Near the forward end of the cylinder 32 a transverse groove 53 is cut to a depth that the bottom 54 lies within a plane in chordal relation to the bore of cylinder 32 to thereby provide a slot 55 constituting an opening through the cylinder side wall. Groove 53 receives the locking plate 34 and is essentially the same width as the locking plate axially of the cylinder so as to prevent displacement of the locking plate lengthwise of the cylinder. Bolts 56 have shanks 57 extending through cylinder wall holes 58 coaxial with holes 59 in opposite edge portions of the locking plate 34. Threaded outer end portions 60 of the bolts' shanks 57 have nuts 61 turned thereonto and thus cooperate with heads 62 of such bolts for retaining the locking plate 34 in the groove 53 and the series of teeth 33a and 34a meshed. Bolt-head-abutting surfaces 62a are adapted to be abutted by facets 64 of the bolt heads 62 to prevent rotation of the bolts 56 during tightening of the nuts 61.

Accidental endwise retraction of the bolts 56 to cause inaccessible recession of the threaded end portions 60 into the locking plate holes 59 is prevented by a plate 65 detachably secured to the cylinder 32 by a cap screw 66. The nuts 61 of the bolts 56 are accessible through a side wall opening 63 of the track frame; note Fig. 2.

Also accessible through the track frame opening 63 is a screw plug 67 which closes a threaded opening 68 at the end of a passage 69 which communicates with the fluid receiving chamber 31 of the hydraulic ram. An enlarged head H on a wrench W illustrated by dot-dash lines in Fig. 3 facilitates it being rotated by direct engagement by the fingers of an operator for either tightening or loosening the screw plug 67.

Operation of the apparatus

When it is desired to adjust the track-tensioning apparatus for diminishing the amount of slack or looseness in the track 17 the nuts 61 will be loosened by means of a socket wrench or the like projected into engagement therewith through the track frame opening 63. Subsequent to substantial loosening or complete removal of the nuts 61 the locking plate 34 will be moved endwise of the bolt shanks 57 for demeshing the teeth 34a from teeth 33a of the ram plunger 33. This operation releases the ram plunger so that it may be adjusted endwise within the cylinder by a change of hydraulic pressure in the chamber 31. Consequently, the screw plug 67 is removed and the discharge tube of a lubricant gun (not shown) will be inserted through the track frame opening 63 and screwed into communicative attachment with the threaded end 68 of the passage 69 and such gun operated for injecting hydraulic fluid into the ram chamber 31. This causes the ram plunger 33, thrust rod 26 and the idler 13 to be projected forwardly an amount selectable according to the quantity of fluid injected into the ram chamber. Following attainment of the desired adjustment of the front idler, the nuts 61 will be replaced for advancing the locking plate into the groove 53 for remeshing the series of teeth 33a and 34a. Since the meshed teeth will then be effective for maintaining the ram adjustment, the grease gun may be detached and the threaded plug 67 replaced.

The vertical sides 53b of the cylinder wall groove 53 constitute means for holding the inserted locking plate 34 either in an inverted position or the reverted position shown wherein the ends of the teeth series consisting of the teeth 34a are relatively reversed endwise of the cylinder. In Fig. 2 it can be ascertained that the series of teeth 34a are out of phase with the median line a—a of the plate holding means constituted by the sides 53b of the groove 53. This out-of-phase relation is a fraction of the span between adjacent of the teeth crests c, whereby the teeth series of the plate 34 is shifted lengthwise of the ram plunger a distance less than such crest span pursuant to inverting or reverting the plate. It is therefore possible to employ the locking plate 34 for engaging and maintaining the ram plunger within a tolerance not exceeding one-half of the span between adjacent teeth crests c of the desired adjustment obtained hydraulically.

The convenience and ease with which the adjustment of the track can be accurately made is conducive to the vehicle operator maintaining proper track-tension adjustment.

Having thus described a single preferred embodiment of the invention with the view of clearly and concisely illustrating the same, I claim:

1. In a track tensioning apparatus for an endless track mounted on a crawler tractor track frame constituting a casing providing an opening affording access to the interior of such frame, a track idler assembly retractively advanceable lengthwise of the frame at an end thereof to exert tensioning force against the track, an elastically retractible force reaction structure in the frame in spaced relation axially thereof from the idler assembly and including an hydraulic ram cylinder having a side wall in registry with the casing opening and extending endwise toward such idler assembly, a ram plunger connected with the idler assembly for movement therewith lengthwise of the frame and projecting reciprocally into the cylinder for endwise adjustment therein, means including a passage having a fluid inlet in registry with the frame casing opening and leading through the cylinder wall for conducting fluid under pressure into the cylinder to adjust the plunger therein attendant to advancing the idler assembly, the cylinder side wall having an exterior groove extending transversely of the cylinder and of a depth radially of the cylinder to form a slot in such side wall in registry with the frame casing opening, the plunger having a series of teeth spaced lengthwise thereof in registry with said slot, a toothed element insertable in said groove to project teeth of such element through said slot into mesh with teeth of the plunger for maintaining selected plunger adjustments, and means for releasably holding the toothed element in said groove.

2. In a track tensioning apparatus for an endless track mounted on a crawler tractor track frame constituting a casing providing an opening affording access to the interior of such frame, a track idler assembly retractively advanceable lengthwise of the frame at an end thereof to exert tensioning force against the track, an elastically retractible force reaction structure in the frame in spaced relation axially thereof from the idler assembly and including an hydraulic ram cylinder having a side wall in registry with the casing opening and extending endwise toward such idler assembly, a ram plunger connected with the idler assembly for movement therewith lengthwise of the frame and projecting reciprocally into the cylinder for endwise adjustment therein, means including a passage having a fluid inlet in registry with the frame casing opening and leading through the cylinder wall for conducting fluid under pressure into the cylinder to adjust the plunger therein attendant to advancing the idler assembly, the cylinder side wall having an exterior groove extending transversely of the cylinder and of a depth radially of the cylinder to form a slot in such side wall in registry with the frame casing opening, the plunger having a series of teeth spaced lengthwise thereof in registry with said slot, a locking plate having a series of teeth and insertable in said groove to mesh such teeth with teeth of the series on the plunger to maintain selected plunger adjustments, said locking plate having bolt-shank-receiving openings in opposite edge portions thereof spaced apart transversely of the cylinder, the cylinder wall having transverse bolt-shank-receiving holes respectively coaxial with the locking plate openings and bolt-head-facet-abutting surfaces in laterally-spaced parallelism with said holes, bolts having shanks disposed in said holes and with end portions projecting from such holes respectively through the locking plate openings coaxial therewith, said bolts also having heads with side facets abuttable against said surfaces to prevent turning of the bolts, and nuts turned upon the projecting end portions of the bolt shanks to secure the locking plate in the groove.

3. The combination set forth in claim 2, wherein there is means detachably secured to the ram cylinder in alignment with portions of the bolt heads axially of the bolt shanks and for abutment by such heads to prevent accidental recession of the projecting end portions of the bolt shanks from access for turning the bolts thereon.

4. In a track tensioning apparatus for an endless track mounted on a crawler tractor track frame constituting a casing providing an opening affording access to the interior of such frame, a track idler assembly retractively advanceable lengthwise of the frame at an end thereof to exert tensioning force against the track, an elastically retractible force reaction structure in the frame in spaced relation axially thereof from the idler assembly and including an hydraulic ram cylinder having a side wall in registry with the casing opening and extending endwise toward such idler assembly, a ram plunger connected with the idler assembly for movement therewith lengthwise of the frame and projecting reciprocally into the cylinder for endwise adjustment therein, means including a passage having a fluid inlet in registry with the frame casing opening and leading through the cylinder wall for conducting fluid under pressure into the cylinder to adjust the plunger therein attendant to advancing the idler assembly, the cylinder side wall having an exterior groove extending transversely of the cylinder and of a depth radially of the cylinder to form a slot in such side wall in registry with the frame casing opening, the plunger having a series of teeth spaced lengthwise thereof in registry with said slot, a locking plate having a series of teeth with intervening crests and grooves extending transversely of the ram plunger and insertable in the cylinder wall groove to mesh such teeth with teeth of the series on the plunger to maintain selected plunger adjustments, means for holding the inserted locking plate alternatively in inverted or reverted positions wherein the ends of the teeth series thereof are relatively reversed, and the teeth series of such plate being out of phase with said holding means lengthwise of such series by a fraction of the span between adjacent of the teeth crests, whereby the teeth series of such plate is shifted lengthwise of the ram plunger by less than such crest span pursuant to inverting or reverting the plate.

5. In a hydraulic ram and locking means therefor, a cylinder having a side wall containing an exterior groove extending transversely of the principal axis of such cylinder and of a depth radially of said cylinder to form a slot in such side wall therein, a plunger reciprocal in said cylinder and having a series of teeth spaced lengthwise thereof in registry with said slot, a locking plate having a series of teeth with intervening crests and grooves extending transversely of the ram plunger and insertable in the cylinder wall groove to mesh such teeth with teeth of the series on the plunger to maintain selected plunger adjustments, means for holding the inserted locking plate alternatively in inverted or reverted positions wherein the ends of the teeth series thereof are relatively reversed, and the teeth series of such plate being out of phase with said holding means lengthwise of such series by a fraction of the span between adjacent of the teeth crests, whereby the teeth series of such plate is shifted lengthwise of the ram plunger by less than such crest span pursuant to inverting or reverting the plate.

References Cited in the file of this patent

UNITED STATES PATENTS

| 547,221 | Mann | Oct. 1, 1895 |
| 625,020 | Chappuis | May 16, 1899 |
| 1,072,313 | Conte | Sept. 2, 1913 |
| 1,124,589 | Casey et al. | Jan. 12, 1915 |
| 1,129,741 | Shannon | Feb. 23, 1915 |
| 1,906,415 | Rauch | May 2, 1933 |
| 2,167,039 | Ekbom | July 25, 1939 |
| 2,372,196 | Grime | Mar. 27, 1945 |
| 2,383,754 | Watt | Aug. 28, 1945 |
| 2,452,671 | Merrill | Nov. 2, 1948 |
| 2,506,360 | Henning | May 2, 1950 |
| 2,643,642 | Geyer | June 30, 1953 |